Figure 1:
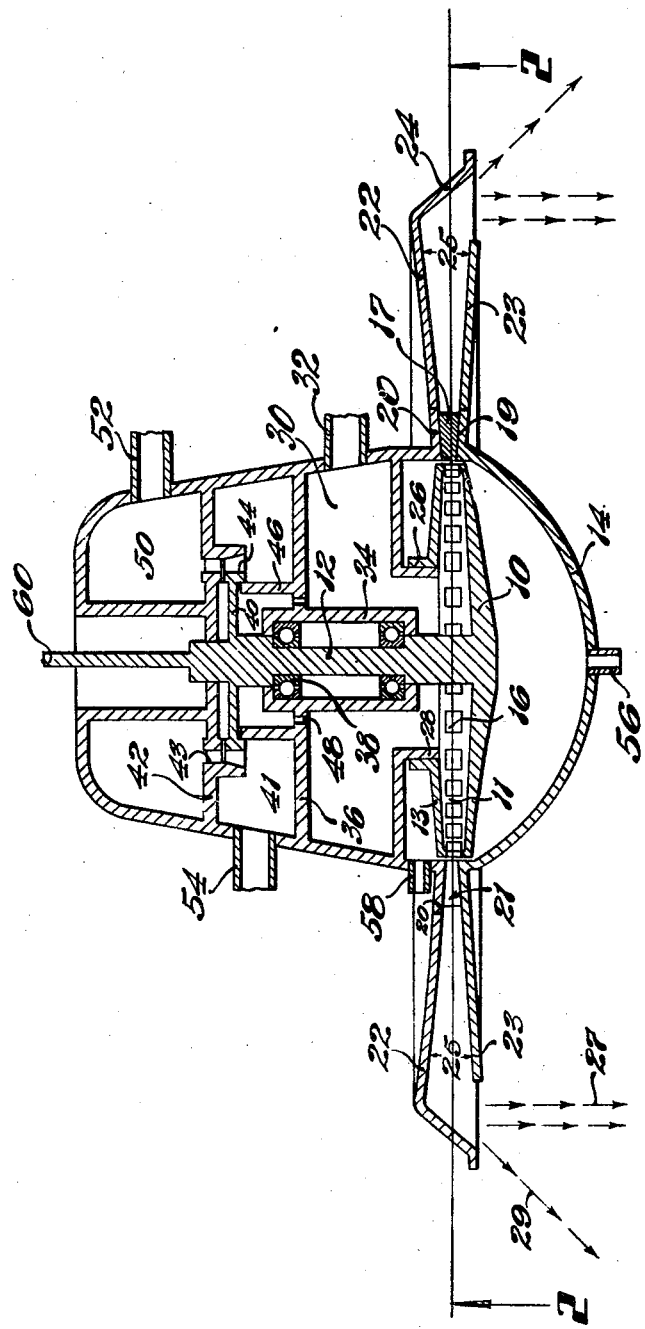

July 4, 1950

C. B. HORSLEY ET AL 2,514,129

APPARATUS FOR GENERATING SOUND WAVES

Filed Oct. 8, 1947

7 Sheets-Sheet 1

INVENTOR.
Compton B. Horsley
Gordon C. Seavey
BY
Kenway, Jenney, Witter & Hildreth
Attys July 4, 1950   C. B. HORSLEY ET AL   2,514,129
APPARATUS FOR GENERATING SOUND WAVES
Filed Oct. 8, 1947   7 Sheets-Sheet 3

INVENTOR.
Capterton D. Horsley
Gordon E. Seavey
BY
Kenway Jenney Witter & Hildreth
Attys July 4, 1950  C. B. HORSLEY ET AL  2,514,129
APPARATUS FOR GENERATING SOUND WAVES
Filed Oct. 8, 1947  7 Sheets-Sheet 5

July 4, 1950 C. B. HORSLEY ET AL 2,514,129
APPARATUS FOR GENERATING SOUND WAVES
Filed Oct. 8, 1947 7 Sheets-Sheet 7
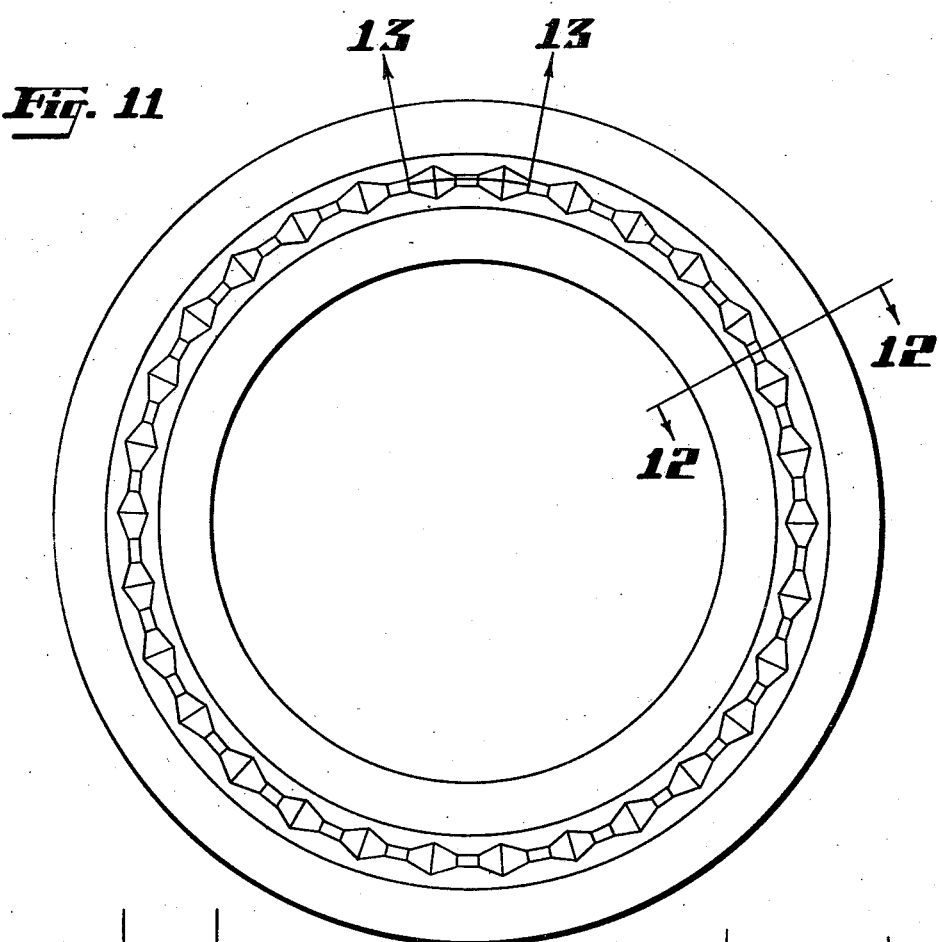
Fig. 11
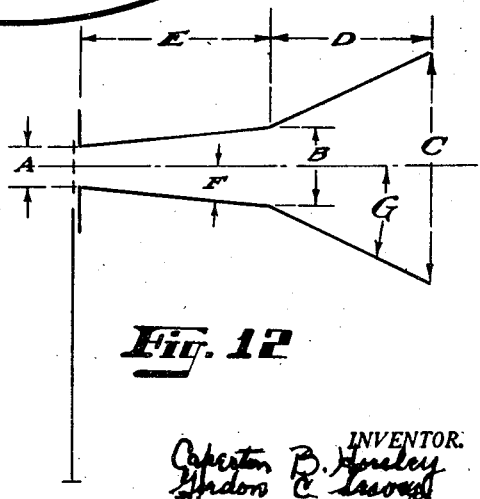
Fig. 12
Fig. 13
INVENTOR.
Caperton B. Horsley
Gordon C. Sawyer
BY
Kenway, Jenney, Witter & Hildreth
Attys.

Patented July 4, 1950

2,514,129

UNITED STATES PATENT OFFICE 2,514,129

APPARATUS FOR GENERATING SOUND WAVES

Caperton B. Horsley, Stamford, Conn., and Gordon C. Seavey, Arlington, Mass., assignors to Ultrasonic Corporation, Cambridge, Mass., a corporation of Massachusetts Application October 8, 1947, Serial No. 778,654

5 Claims. (Cl. 116—147)

Our invention relates to improvements in apparatus for generating sound waves.

Sirens of various types have been employed successfully for signalling and alarms. Recently, however, serious attempts have been made to utilize sound wave energy on a commercial scale in many industrial applications such as aerosol agglomeration, spray drying, and in various chemical reactions. For operations on a basis of practical economy, sound waves must be produced with intensities several orders of magnitude greater than anything heretofore available to the art. Electro-mechanical devices are capable of producing high intensities but only over areas so small as generally to be commercially unimportant, while ordinary sirens are notoriously inefficient.

The most important object of our invention is to provide a mechanism for generating large amounts of acoustic power efficiently.

Another object of our invention is to provide a mechanism for generating large amounts of acoustic power at frequencies greater than 1000 cycles per second.

Another object of our invention is to provide a mechanism for generating high amplitude sound waves and forming them into a sharply focussed beam.

Still another object of the invention is to provide means for generating large quantities of acoustic power in a directional beam and at a closely controllable frequency.

We prefer to embody our invention in a siren type of device in which a high speed slotted rotor turns within a correspondingly slotted stator. The stator slots are coupled with an annular horn and reflector providing good radiation and focussing so that the sound waves may be applied as a beam to the area where they are to perform work. We have found it convenient to turn the rotor by means of a turbine wheel mounted on the rotor shaft.

One feature of the invention resides in an annular horn which merges into the stator slots, the horn and slots being so dimensioned as to serve both as efficient sound radiators and as nozzles aerodynamically correct for smooth passage of the direct current air flow, the horn also being designed simultaneously to transmit in one direction the direct current air flow and in another direction a sharply focussed sound wave beam.

Another feature of the invention comprises pressure containing means for the prevention of air leakage through closed stator slots.

Another feature of the invention comprises a rotor-stator combination embodying slots of special design by means of which air turbulence is reduced to a satisfactory minimum.

Another feature of the invention consists in a rotor-stator-horn combination wherein air is passed axially into the rotor and outwardly through radially directed rotor slots and stator slots and as sound waves through a radial annular horn, an arrangement making it feasible to produce high amplitude, sharply focussed sound beams with minimum weight and size of equipment and over a wide range of frequencies.

Still another feature of the invention resides in a stator throat having an angle of divergence providing maximum radius of curvature of the wave front.

Figure 2:
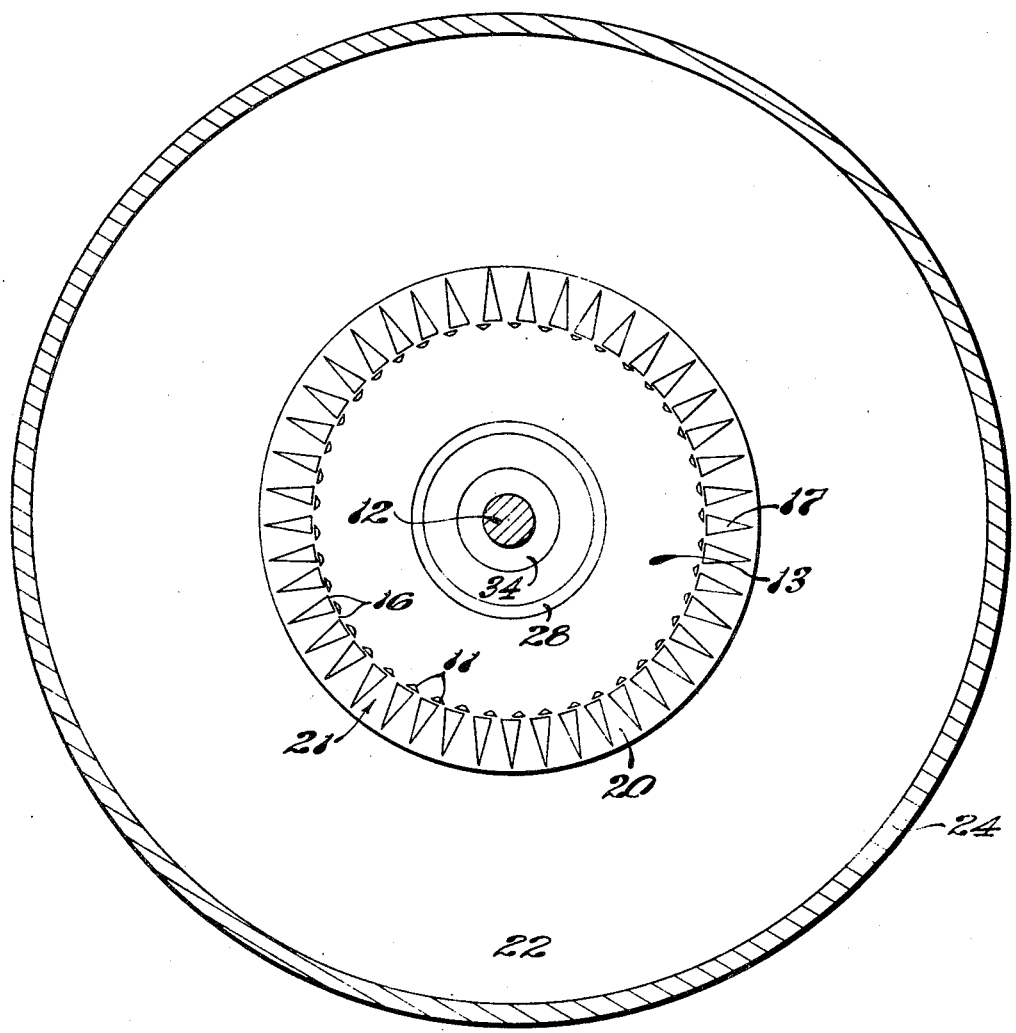
Figure 3:
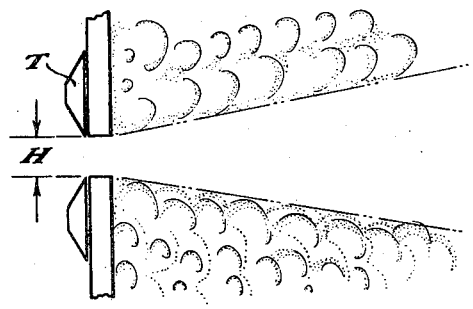
Figure 4:
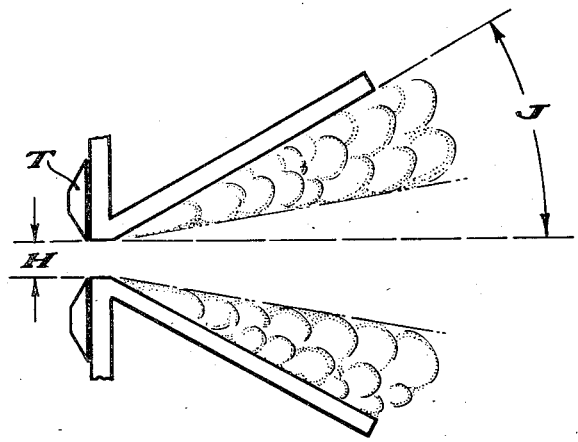
Figure 5:
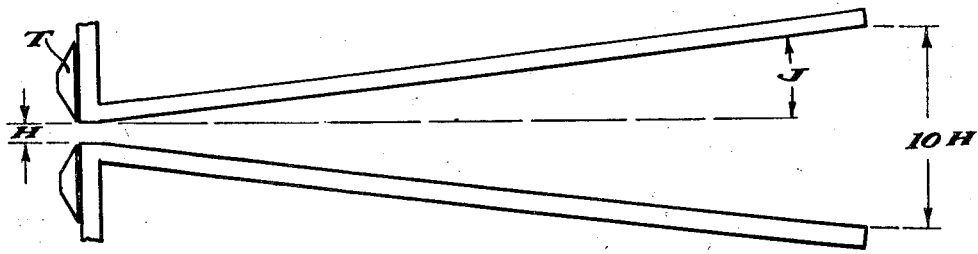
Figure 6C:
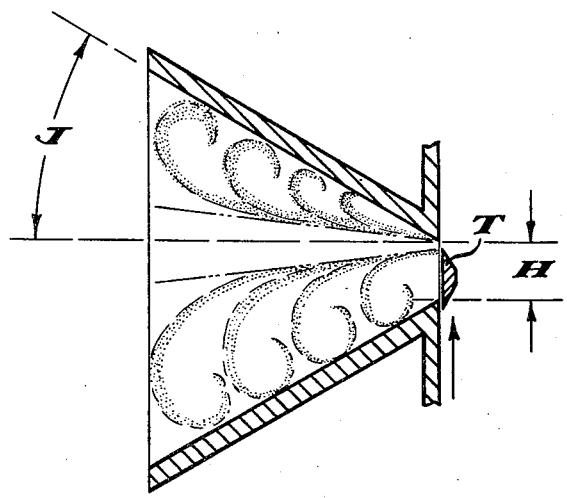
Figure 6B:
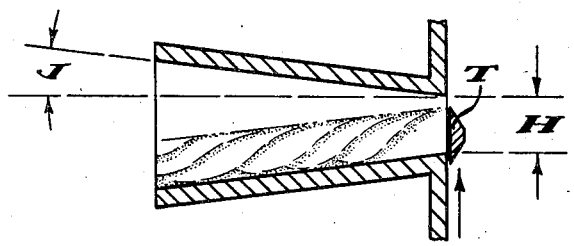
Figure 6A:
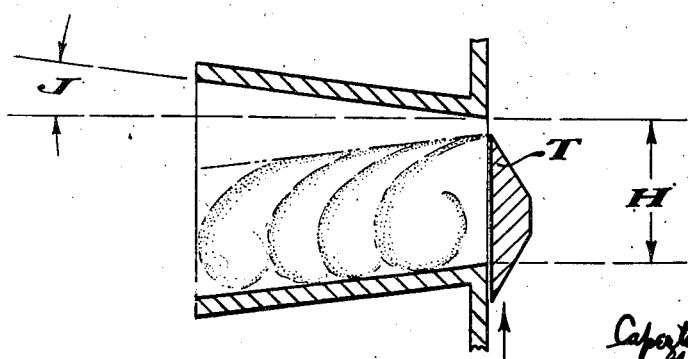
Figure 7:
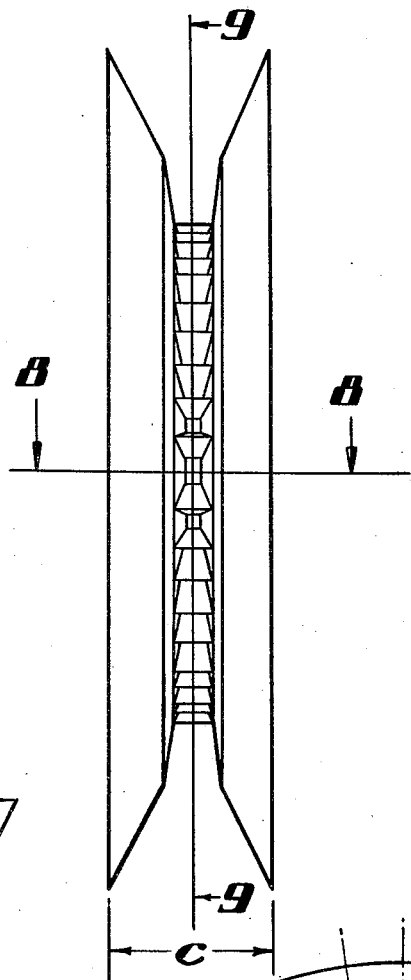
Figure 8:
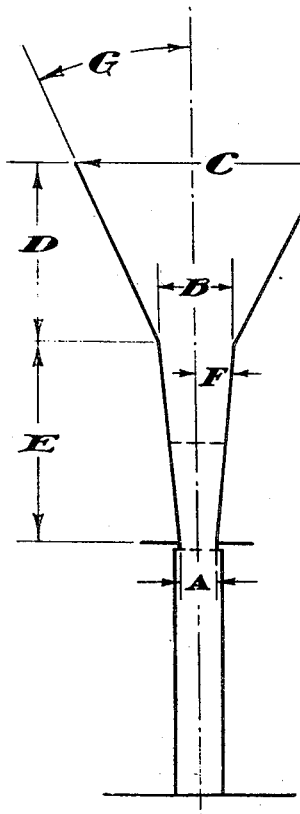
Figure 9:
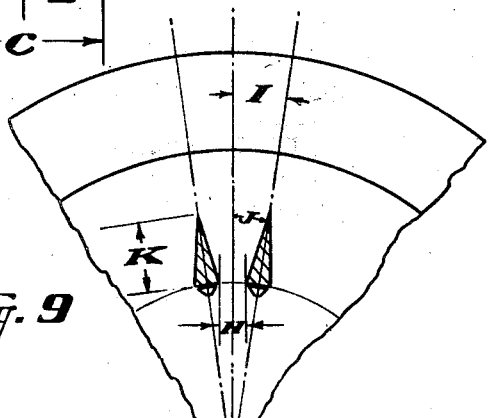
Figure 10:
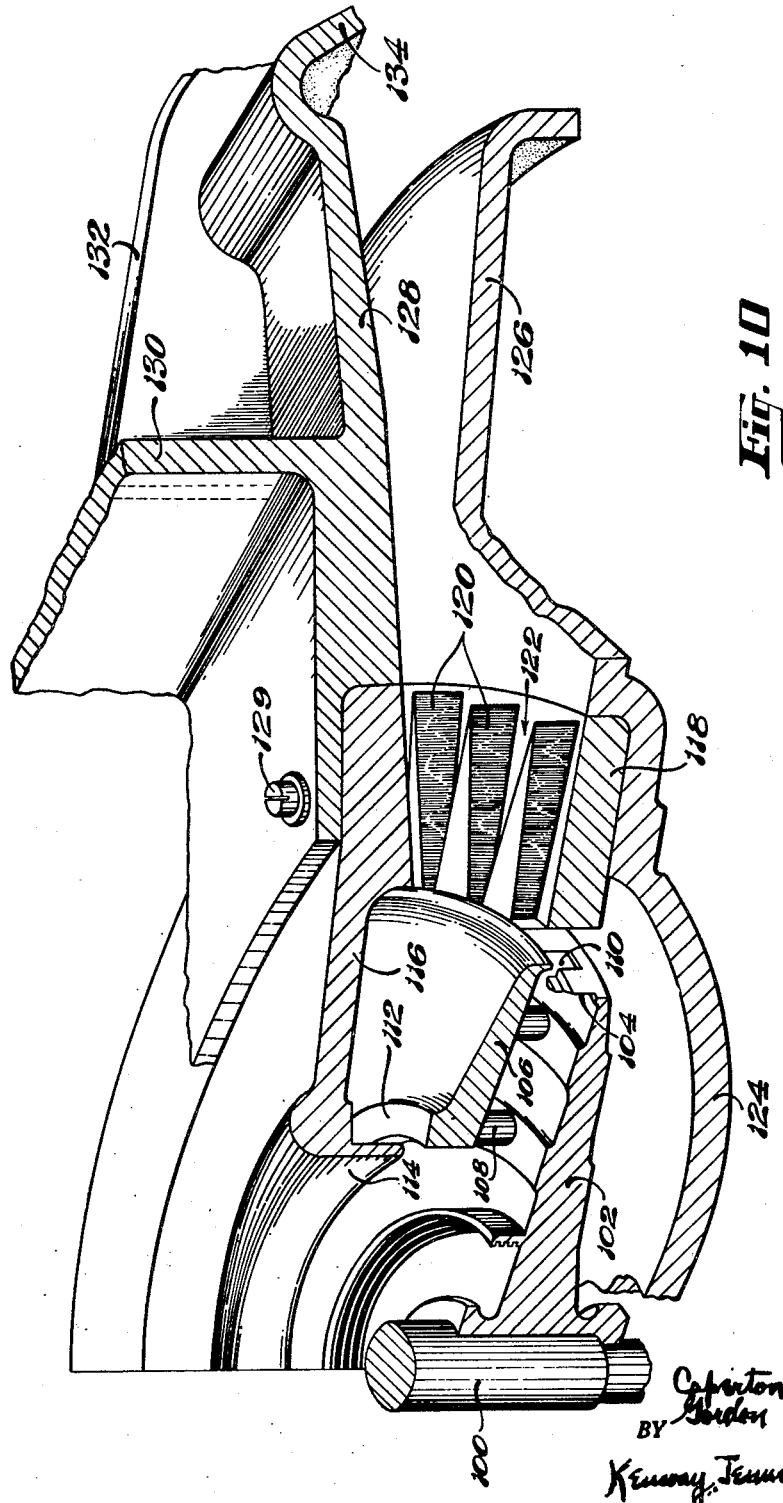

These and other objects and features of the invention will be best understood and appreciated from the following detailed description of preferred embodiments of the invention selected for purposes of illustration and shown in the accompanying drawings in which:

Fig. 1 is a view in cross-section through a simplified form of sound wave generator, Fig. 2 is a view in cross-section along the line 2—2 of Fig. 1, Fig. 3 is a diagram showing the behavior of air and sound passing through a stator opening, Fig. 4 is a diagram showing a stator opening coupled to a wide throat, Fig. 5 is a diagram showing a stator opening coupled to a narrow throat, Figs. 6a, b, and c are diagrams illustrating the relation between throat divergence and stator opening dimension, Fig. 7 is a diagram in elevation of a stator-rotor combination, Fig. 8 is a view in cross-section along the line 8—8 of Fig. 7, Fig. 9 is a view in cross-section along the line 9—9 of Fig. 7, Fig. 10 is a view in perspective of a preferred form of rotor, stator, horn assembly, Fig. 11 is a diagrammatic view in end elevation of a generator constructed for axial air flow, Fig. 12 is a view in cross-section along the line 12—12 of Fig. 11, and Fig. 13 is a view in cross-section along the line 12—12 of Fig. 11.

There are many phases of the invention to be considered, and in organizing the description we have deemed it best first to describe a somewhat simplified form of sound wave generator as shown in Figs. 1 and 2. We shall then proceed to discuss the theoretical aspects of the specific features of the invention, feeling that they will be best appreciated by virtue of their relation back to the more general description of the sound wave generator. The description of the generator shown in Figs. 1 and 2 may, in one sense, be regarded as a description of the considerations preceding the actual generation of the sound wave. The next step, logically, is the description of the actual generation of a wave and the factors involved; finally we shall discuss the manner of radiating and focussing the sound waves.

As shown in Fig. 1, the simplified version of a generator, a hollow disk shaped rotor is comprised of a lower dished circular plate 10 provided around its periphery with a circumferential series of upstanding teeth 11 effectively triangular in cross-section and reduced at their upper ends to receive a depending flange on the rim of a second dished annular plate 13 secured to the plate 10. The upper plate 13 is provided internally with an annular rim 26 leaving a circular space concentric with its axis of rotation and affording access for air or other fluid to the interior of the rotor. The bottom plate 10 is fixed on the lower end of a shaft 12 journalled for rotation in a housing 14. Between each pair of teeth 11 is a radial slot 16 communicating with the interior of the rotor.

Surrounding the rotor is a stator comprising an upper annular member 20 disposed on a plurality of wedge-shaped spacers 17 integral with a bottom annular member 19. The spacers are arranged to form the side walls of a plurality of stator slots 21 radially directed and diverging outwardly. The upper and lower walls of the stator slots are formed by the members 19 and 20 which also diverge outwardly and are secured in the housing 14 in such position that there is a minimum space between their inner faces and the outer face of the rotor. It is contemplated that the number of rotor slots 16 will be equal to the number of stator slots 21, the alignment and dimensions being such that the turning of the rotor causes its teeth and slots alternately to open and close the stator slots.

As shown in Fig. 1 the stator walls merge smoothly into a radial, annular horn composed of an upper wall 22 and a lower wall 23. The wall 22 terminates in an inclined wall or ring 24 by means of which sound waves are reflected to form an annular focussed beam. In Fig. 10, a perspective view of the rotor-stator-horn combination is shown as embodied in an actual generator we have tested. Its description will best be understood after the reading of the discussion of the principles involved. We shall now continue the description of the device shown in Figs. 1 and 2.

Cooperating in sealing relationship with the rotor rim 26 is an annular rim 28 carried on a solid annulus directed inwardly from the outer wall of the housing 14 and defining a chamber 30 connected by a pipe 32 to a source of compressed air (not shown). Within the chamber 30 is a cylindrical bearing housing 34 supported by a wall 36 integral with the housing 14 and serving to close the top of the chamber 30. Two sets of bearings are contained in the housing 34 and journal the shaft 12 for high speed rotation. Details of lubrication seals and cooling conduits have been omitted.

Mounted near the upper end of the shaft 12 is a turbine wheel 40 contained within a chamber 41 formed by the wall 36 and an upper wall 42 also disposed within the housing 14. The wall 42 contains an annular series of turbine nozzles 43 cooperating with the blades of the wheel 40. The turbine wheel has an integral annular depending rim 44 at its outer periphery cooperating in sealed relation with the upper end of a cylindrical wall 46 mounted on the wall 36. A series of ports 48 provides communication between the chamber 30 and the interior of the cylinder 46. Above the wheel 40, walls form an annular chamber 50 connected by a pipe 52 to a source of compressed air (not shown). Below the wheel 40 the chamber 41 is served by an exhaust pipe 54.

A port 56 is provided in the bottom of the housing 14 to maintain the area beneath the rotor at atmospheric pressure, and a similar port 58, above the rotor 10, also let into the housing 14, admits atmospheric pressure to that portion of the top of the rotor between the periphery and the rim 26. If high pressure fluid in the housing 14 is admitted to the top and bottom of the rotor, much of the efficiency of the generator is lost through leakage around the periphery of the rotor and into the stator slots when the rotor teeth are in position to close the stator slots. However, with the vents shown, the pressure on the outside of the rotor will be substantially atmospheric, so that significant leakage into the stator slots will not occur. Some leakage through the rotor slots to the outside of the rotor will occur but proper machining and close spacing of rotor and stator will reduce it to a minimum and this leakage will not reduce the efficiency nearly as much as would this same amount of leakage into the stator slots during the closed position. Any leakage of fluid through the seal at the rims 26 and 28 will dissipate through the vent 58.

The use of vents 56 and 58 involves a downward thrust on the rotor which would greatly increase the load on the bearings unless compensatory measures were taken. It should be noted that the ports 48 provide means for equalizing the pressures in the chamber 30 and in the cylinder 46. When air under pressure is introduced into the chamber 30, its thrust is directed equally, upwardly against the bottom of the turbine wheel and downwardly against the rotor. Consequently the assembly of rotor, shaft, and turbine wheel is sufficiently balanced regardless of the pressure of the fluid supplied to the rotor.

When air or other fluid under pressure is forced through the pipe 52 to the annular chamber 50 and through the nozzles 43, the turbine wheel rotates to drive the shaft 12 and the rotor 10. Spent turbine air leaves through the pipe 54. Air or other fluid under pressure also enters the pipe 32, the chamber 30, and the interior of the rotor 10. This air can leave the generator only through the rotor and stator slots except for the small amount of leakage air passing through vents 56 and 58.

As the rotor turns, all the stator slots are simultaneously opened and closed by the rotor. Air therefore flows intermittently through the stator slots in pressure waves at a rate or frequency in cycles per second equal to the product of the number of slots and the R. P. M. of the rotor divided by 60. For example an 80 slot system turning at 5000 R. P. M. will produce sound waves at a frequency of 6666 C. P. S. The sound waves are radiated from the stator slots through the annular horn and reflected into a beam by the wall 24. The angle at which the wall is inclined with respect to the axis of the horn substantially determines the focal distance of the beam which may vary according to the nature of the work to be performed by the sound waves.

The shaft 12 terminates at its upper end in a reduced shaft 60 from which tachometers and lubricating oil pumps may conveniently be driven.

The construction shown in the drawing affords independent control of frequency and amplitude. That is to say, the frequency depends upon the force applied to turn the turbine, while the amplitude, or power output, is a function of the rotor air supply pressure. In cases where fixed frequency is desired with fixed power output, the system may be serially connected to supply rotor air from the turbine exhaust. While air is perhaps the more conventional driving means, steam or other fluid or liquid may be employed.

In the form shown in the drawings the vertical partitions separating the stator throats terminate at the ends of the throat portions. The upper and lower walls, however, are continued. In Fig. 1 a vertical wall is shown at 17. The horn formed by the bottom wall 23 and a top wall 22 defines an annular outwardly divergent space. The horn opening therefore has one very large dimension, that is, the circumferential length of the radiating ring, which means that the other dimension, the width of the ring, need be only about a half wavelength for efficient radiation of acoustic power, as will be explained later.

Finally, the reflector 24 provides directionality for the sound as coming from an annular source. Since the wave front is defined for practical purposes by a single radius of curvature, the reflector may be most accurately and effectively disposed. Of course, the horn will have a cut-off frequency below which the radiation efficiency drops off. When a wavelength exceeds the radius of curvature of the wave front, considerable lateral expansion takes place, resulting in deleterious phase displacement between the velocity and pressure components of the sound wave. However, the relatively large radius of curvature of the wave front in one dimension that is provided by the annular horn results in making it possible to construct a horn with a conveniently low cut-off frequency without resort to large dimensions and weights. One important feature of the invention resides in an annular horn providing a low frequency radiation from a relatively small sound wave generator.

Examination of Fig. 1 reveals that the sound waves are "optically" reflected by the wall 24 as shown by the arrows 27. However the air stream follows different laws and is effectively directed outwardly as shown by the arrows 29. This separation of air flow from sound is valuable in many cases where the work to be performed by the sound waves would be adversely affected by a blast of air.

We now pass to a consideration of the form of the stator slots and horn. In view of the fact that the art has not yet progressed to the point where a definite terminology has been established, we shall first proceed to define several of the terms which will be used throughout the specification and claims. The rotor is shown in the diagrams Figs. 3-9 as a series of teeth T which are substantially triangular in cross section and spaced as closely as possible to the inner periphery of the surrounding stator. The stator slots begin with the opening at the inner face of the annular stator and will usually take the form of a rectangle. The term "stator opening" is used to denote only the opening in the stator wall in the plane of the inner periphery thereof. From the rectangular opening the walls diverge in the plane perpendicular to the direction of rotor movement as well as in the plane of the rotor movement. The angle of divergence in the walls of both planes is important and the length of the diverging walls is also important. This first part of the radiating system we refer to as the "throat." At the outer end of the throat the walls may begin to diverge at wider angles and we come to that part of the system which we refer to as the "horn."

Referring now to Figs. 8 and 9 we have shown the dimension of the stator opening in the direction transverse to the rotor movement as A. At B there appears the dimension, in the same plane as A, at the end of the stator throat and beginning of the horn. At C, in the same plane as A and B we have shown the dimension of the outer end of the horn. At D we have shown the radial length of the horn. At E we have shown the radial length of the throat, D and E being in the same plane as A, B and C. At F we have shown the half angle of divergence of the throat walls in the plane transverse to the direction of rotor movement. At G we have shown the half angle of divergence of the horn walls, still in the same plane. In Fig. 9 appear the angles and dimensions in the other plane, that is in a plane parallel to the direction of the rotor movement. In this plane H represents the dimension of the stator opening, I represents the half angle of divergence of the horn, J represents the half angle of divergence of the throat, and K represents the radial length of the throat. In this plane the horn walls proper so merge that the effective radiator is a continuous annulus.

In discussing the features of the stator and horn we shall proceed on the assumption that our remarks are valid in the case of a sound wave generator constructed to produce sound waves in the frequency range from 1 kilocycle or somewhat less to somewhat over 200 kc. This we regard as the range of prime industrial importance; some conclusions stated herein may be subject to modification in the case of generators built to operate at much lower frequencies or at frequencies very greatly in excess of 200 kc.

One method of creating acoustic power is to raise the pressure of a fluid and convert the pressure increment to acoustic power. In order to carry out this conversion efficiently and make it feasible to obtain large amounts of acoustic power from a conveniently small size sound wave generator, it is necessary to supply air to the rotor at a pressure in excess of 2 lbs. per square inch. At lower pressures the generator becomes necessarily unduly large, and the amount of power required to turn the rotor would ordinarily be undesirably great.

With the foregoing remarks as a frame of reference we come now to an examination of the specific features of the rotor-stator-horn combination. Logically we may start with the dimensions of the stator opening, that is to say, the dimensions A and H appearing on the various figures. In order to understand the importance of selecting the proper dimensions, it is first necessary to consider several factors incident to the generation of sound waves.

Serious phase displacement between pressure and velocity occurs when the fractional lateral expansion of a wave front per wavelength is excessive. This may be stated another way, slightly less rigorously, by saying that serious phase displacement occurs when the radius of curvature of the wave front is excessively small; less, for example, than one half wavelength. It then follows that in a wave front exhibiting curvature in two dimensions the effective phase displacement is in the order of twice the displacement found in a wave front curving only in one direction.

A flat diaphragm having a diameter in the order of one wavelength or somewhat less may, for practical purposes, be regarded as the equivalent of a sphere of the same diameter as a source of sound wave radiation. Generally speaking, a sphere or disc having a diameter greater than one wavelength is considered to be a "good" radiator, the improvement of radiation efficiency with diameter increase being relatively unimportant above one wavelength.

For purposes of the present discussion we may consider that sound generated by an intermittent flow of air, as in the structure of our invention, is similar to that generated by a diaphragm undergoing periodic forward motion without appreciable backward movement.

If efficiency in converting electrical or mechanical power into acoustic power is to be considered, the foregoing reasoning leads to the conclusion that as the radiating area decreases below one wavelength in maximum dimension, there will be an increase in the amount which that area must be moved in order to radiate a given amount of power. In consequence energy will be lost in the form of heat because of the excess pressure variation required.

It is desirable, as previously stated, in constructing a high amplitude sound generator, to employ relatively high rotor air pressures, viz. 10 to 60 p. s. i. g. or more, and thus relatively small rotor slot dimensions; therefore, the rotor and stator apertures will generally be significantly less in dimensions than a wavelength of the sound to be created for work at frequencies below about 20 kc. Above 20 kc. the wavelength is so small that it may be practical to employ stator apertures equal to or greater than the wavelength. Accordingly, below 20 kc., and often at much higher frequencies, a "horn" is required as a means for providing a large radiating area.

One further point that should be considered is illustrated in Fig. 6a where a stator opening H is shown as relatively large, although the other design considerations are properly carried out. It will be noted that when the rotor tooth T is about to close the opening H, there is an excessive amount of turbulence in the throat of the stator. This turbulence causes loss of power through heat and also distorts the wave front of the sound wave being generated. In Fig. 6c there is illustrated another arrangement in which this excessive turbulence is encountered, through too rapid divergence of the throat walls, and in spite of proper dimensioning of the stator opening.

In Fig. 6b the opening H has been reduced from the dimension shown in Fig. 6a, the throat walls diverge at the proper angle, and it is evident that when the tooth T is about to close the opening H, the air flow strikes the wall of the throat before the vortices develop to a significant extent. The air flow is directed in a more or less laminar fashion along the wall of the throat. We have found that for efficient operation the dimension H should generally not exceed one-half inch.

There is a further factor affecting the dimension A. When the rotor is turning at high speed, centrifugal force tends to bend the rotor teeth T outwardly. The teeth must therefore be stout enough to remain rigid in view of the very close spacing required between the inner face of the stator and the outer face of the rotor. The tendency of the teeth to bend in response to centrifugal force increases with the length of the teeth, and the problem cannot be solved merely by making the teeth of greater effective thickness because to do so results in the formation of confined air columns in the rotor, the effect of which is to reduce the efficiency of sound wave generation, in view of the added volume of air which must be set in motion in order to generate the wave. If the H dimension is maintained at the half inch previously mentioned as desirable for aerodynamic reasons, the A dimension may be determined in accordance with the factors of rigidity of the rotor teeth as well as the desired acoustic output. As A increases, the acoustic power output also increases if the same rotor pressure is maintained.

The foregoing remarks may be summarized by stating that an important feature of the invention resides in employing stator openings not exceeding one half inch in dimension, in the direction of the rotation of the rotor. In the event that the rectangular geometry of the opening is departed from, it will be evident that the foregoing factors will be applicable to the equivalent dimensions concerned.

We shall now discuss the factors underlying the selection of the half angles of divergence of the throat walls, that is to say, the angle F as shown in Figs. 8 and 12 and the angle J as shown particularly in Figs. 4, 5 and 9.

We not only have the problem of sound radiation efficiency, but also the aerodynamic considerations required for smooth handling of the flow of air through the stator throats in order to eliminate excessive turbulence which would distort the wave front and adversely affect the efficiency of sound generation and radiation.

Fig. 3 represents diagrammatically a portion of a stator showing an opening H combined with a pair of rotor teeth T. In this case the stator has no throat whatsoever and is merely a relatively thin wall. When the opening H is uncovered by the teeth T, air rushes through the opening and into the atmosphere on the right hand side. Surrounding the jet there will be a relatively large zone through which will extend considerable air turbulence. Assuming that H is less than a wavelength, the sound wave will expand laterally and the wave front will have a relatively short radius of curvature. Consequently there will be aerodynamic turbulence and phase displacement of pressure and velocity, both working against the efficiency of sound wave generation and radiation.

In Fig. 4 there has been added to the diagram of Fig. 3 a wide angle throat in which the half angle of divergence is roughly 30°. It will be observed that although the walls of the throat cut off some of the area of turbulence surrounding the jet opening of Fig. 3, there is still a relatively large zone through which turbulence will occur. Because of the somewhat large, effective radiating surface, the generation and radiation of sound in a device having a throat as shown in Fig. 4 will be more efficient than the arrangement shown in Fig. 3 but will still not be satisfactory at rotor pressures of more than 2 p. s. i. g.

In Fig. 5 there is shown a segment of a rotor-stator combination in which the throat walls diverge at half angle J of 7°. In this figure we approach optimum conditions both from the standpoint of the progress of a sound wave and from aerodynamic considerations. The opening H and the throat form a nozzle through which the D. C. flow of air proceeds in satisfactory smooth laminar fashion without separation from the walls of the throat. Consequently there is no appreciable amount of turbulent air in the throat. The dimension H may be one tenth of a wavelength, for example, and the throat may continue to the point where its maximum dimension is ten times the H opening, or a full wavelength. For the reasons hereinbefore recited, the wave front leaving the throat of Fig. 5 will have a relatively great radius of curvature. Consequently there will be a minimum phase displacement between pressure and velocity. In other words Fig. 5 represents a theoretical optimum condition for the generation and radiation of acoustic power.

If the half angle of divergence J (or F in the other plane), significantly exceeds 12°, the air stream tends to become separated from the throat walls, creating eddy currents and turbulence. If the half angle of divergence is less than 3°, the skin friction of the air along the walls reduces the efficiency below generally desirable limits. Consequently, one important feature of the invention resides in a throat coupled to a stator opening and having walls diverging at a half angle between 3° and 12°. If for any reason it is desired that the wall surfaces depart from linearity, there should be no substantial segment of the walls which diverges at a half angle of greater than 12° until the cross-sectional area of the throat is at least two or three times the area of the stator opening, although small departures from linearity may not significantly affect the efficiency.

Fig. 6 illustrates the relationship between the H dimension of the stator opening and the angle of divergence of the throat walls, that is to say the half angle J. In Fig. 6a the walls diverge at a half angle J between 3° and 12°, but the H dimension is so large that considerable turbulence occurs when the rotor teeth T are either initiating the opening of the stator slot or reaching the almost closed position illustrated in the figure. In Fig. 6c the H dimension is satisfactorily small, a half inch or less, but the half angle of throat wall divergence J is about 30°. Here again there are large zones of turbulence due to separation of the D. C. air flow from the walls of the throat when the opening is almost closed, or is just opening. The same considerations apply to Fig. 6 as those discussed in conjunction with Figs. 3, 4 and 5, the only difference being that Fig. 6 illustrates the special condition obtaining when the stator opening is reduced to a small fraction by the position of the rotor teeth T. In Fig. 6b there is shown a satisfactory small stator opening H coupled with a throat having walls diverging at a half angle between 3° and 12°. Fig. 6b corresponds to Fig. 5 but represents the operation of the device when the stator opening is nearly closed. It can be seen that the air flowing into the throat is smoothed out by early impact upon the opposite wall thereof so that the throat functions at best efficiency at all positions of the rotor teeth.

In Figs. 7, 8 and 9 the representation is still diagrammatic but more nearly approaches the actual construction in which we have embodied our inventive features. The dimensions A and H and the angles F and J are still subject to the same considerations previously discussed. We now have the dimensions and angles in two planes to consider, Figs. 3–6 being confined to diagrams representing a single plane. Reflection will make it evident that K, the radial length of the throat walls in the plane of Fig. 9, is determined by the number of stator openings, the angle of divergence of the stator openings in the plane shown, and by the dimension H. The angle I is the angle between a line from the center of the rotor radially through the center of the stator opening H and a line from the center of the rotor radially outward through the center of the spacer lying between adjacent stator openings. If this angle I significantly exceeds 15° there may be an unsatisfactory turbulent condition existing in the zone where the sound waves and air stream through one stator throat merge into the sound wave and air stream issuing from the adjacent throat. Therefore in designing the stator, care should in general be taken that the angle I does exceed 15°.

Fig. 9 represents a rotor-stator combination in the plane at 90° to that shown at Fig. 8. We have already discussed the considerations applicable to the dimension A and to the angle F. We have now to discuss first the length of the throat, that is to say the dimension E or that portion of the radiating system in which the half angle of divergence should lie in the range of 3° to 12°. At rotor pressures of more than 2 p. s. i. g., it is generally desirable for E to be sufficiently long to permit the cross-sectional area of the throat at its outer end to be at least two or three times the area of the stator opening. It must be remembered that in the throat portion of the radiating system we must have not only a satisfactory conduit for the sound wave, that is to say one in which the sound wave clings properly to the throat walls and minimizes phase displacement by maintaining a satisfactorily large radius of wave front curvature, but the throat must also act as an efficient aerodynamic nozzle in which the D. C. air stream does not separate from the throat walls to create turbulence. If we imagine that the sound wave is initiated when the rotor tooth commences to open the stator opening and is ended when the rotor tooth completely closes the opening again, it follows that the front of the wave will have progressed along the throat exactly one wavelength at the instant when the stator opening is again shut. If the sound wave can be completely created in the absence of turbulence, we have expended the maximum amount of energy in the creation of the wave and the minimum amount in the creation of turbulence.

The dimension B represents the width of the throat at its outer end and is determined by the combination of the dimension A, the angle F and the dimension E. It is preferable that the dimension B be at least one half wavelength so that the radius of wave front curvature immediately after the sound wave leaves this opening will be satisfactorily large.

In view of the fact that we have related some of the dimensions to a "wavelength," we think it may serve to clarify matters if we explain that although the considerations here treated are applicable to sound wave generators operating between one kc. and more than 200 kc., it is not our thought that a single generator would be built to operate throughout this extended range. Where it is desired to employ a sound wave generator for a particular purpose in which a given frequency produces the optimum result, the generator will be designed to operate with maximum efficiency at the frequency selected. There will be other instances where it is desirable to produce a generator capable of operation throughout a frequency range where the frequency varies by a factor of ten or more.

In such cases the generator may be designed to operate at maximum efficiency at some intermediate frequency in the desired range. For example, in a generator built to operate at 100 kc., where the wavelength is roughly .13" in static air the dimensions E and B can be much less than in the case of a generator built to operate at 3 kc. where the wavelength is roughly 4.4" in static air. Incidentally, the figures for wavelength should be increased by a factor representing the increase due to the speed of the air moving through the throat, since the important factor is the length of the wave with respect to the stator surfaces. It can be shown mathematically that the air admitted at a stator port will actually accelerate through perhaps as much as the first half of the stator throat. The speed attained will approach the speed of sound. Consequently the change in the wavelength in the stator throats is an important consideration, in spite of the fact that the velocity of the air later decreases.

We have now treated the angles and dimensions pertaining to the stator opening and to the throat. We come now to a consideration of the factors affecting the design of the "horn." Its inner end dimensions will, of course, be determined by the design of the throat with which the horn is smoothly merged. Inasmuch as the throat serves as a nozzle, the velocity of the air stream will be sufficiently lessened at the outer end of the throat to the point where aerodynamic considerations no longer play an important role in the generator. Consequently the angle of divergence of the horn walls can be permitted to increase substantially over the angle of divergence of the throat walls. As previously explained, aerodynamic considerations largely force the half angle of divergence of the throat walls to below 12°. However, sound waves will not separate from the walls unless the half angle of divergence exceeds 30°. Consequently the horn walls may diverge exponentially in accordance with conventional acoustic practice or proceed at any half angle of divergence which does not exceed about 30°.

At this point reference is made to Fig. 7, from which it will appear that the horn is not restricted by walls in the plane parallel to the movement of the rotor, so that there are no factors tending to reduce the radius of wave front curvature in that plane. Consequently the dimension C which is the width of the horn at its outer end in the plane transverse to the rotor movement may be as small as half a wavelength. Indeed the dimension may be reduced to a quarter wavelength without disastrous results. If it were not for the large radius of curvature obtained in the other plane due to the annular construction of the horn, it would be necessary to make the dimension C at least equal to a half wavelength and preferably a wavelength. The dimension D, the radial length of the horn, is obviously determined by the combination of the angle G and the dimension C.

Incidentally it should be pointed out by reference to Fig. 1 that the permissible small dimension C results in making it less difficult than would otherwise be the case to produce a well confined and sharply defined sound beam.

We have not as yet discussed the relationship between the width of the rotor and stator openings in the H plane. We have found that it is generally preferable to make the circumferential length of the rotor teeth equal to the maximum rotor opening dimension in the same plane and to make both of these dimensions slightly larger than the stator opening H. In view of the difficulties encountered in machining rotors and obtaining precisely even spacing of the teeth thereof, we have found it preferable to make the base of each spacer between the stator throats somewhat wider than the maximum dimension of the rotor teeth. If this is done, it provides accommodation for small irregularities in the spacing of the rotor teeth. It has been proposed by others to make the rotor openings two or more times as wide as the stator openings and to make the distance between stator openings three or more times greater than the stator openings. However, we have not generally found it necessary or desirable to go to such lengths.

The advantages of the radial rotor slots, stator slots and horn are many. To begin with, the radial rotor slot arrangement permits the teeth to be firmly anchored between two disks so that vibration of the rotor teeth is minimized. In the case of a flat rotor disk where the teeth are radial continuations thereof, there will be considerable peripheral vibration because only one end of each tooth is supported. But as shown in Figs. 1 and 10, motion of the teeth is inhibited by the upper clamping member of considerable mass roughly paralleling the rotor disk and removed from it by the length of the teeth.

Secondly the radial stator slot arrangement makes it possible to provide a stator formed of two pieces conveniently shaped for accurate machining.

Thirdly the annular horn may conveniently be constructed from a pair of annuli accurately machined. The difficulties of conventional horn construction are decreased.

Fourthly the cylindrical horn shape distributes the acoustic power over a relatively long narrow path facilitating focussing of a sharp beam.

Fifthly the radial horn arrangement results in an appreciably low cut-off frequency for the space and weight of horn employed.

Sixthly the radial horn combines easily with any one of a number of reflector plates or rings inclined at different angles to produce a beam focussed at any convenient distance from the horn.

Finally the radial horn and reflector ring provide convenient means for directing the sound waves as a beam in one direction while the air flow takes a different direction. This valuable result comes from the fact that sound waves are reflected from a surface at the angle of incidence, whereas a current of air leaves a surface at less than the angle of incidence.

In Fig. 10 we have shown a view in perspective, partly sectionalized, of the rotor-stator-horn assembly of a sound wave generator we have built and successfully tested. The showing in Figs. 1 and 2 omits nothing essential to an understanding of the organization, construction, and operation of a sound wave generator embodying our invention but has been altered in minor respects only for the sake of clarity in presentation and drawing. In the device shown in Fig. 10 there is provided a shaft 100, preferably driven by a turbine arranged as in Fig. 1, fixed to a concave metal disk 102 serving as the bottom rotor member. Along the outer periphery of the disk 102 there is a series of upright teeth 104 substantially triangular in cross-section and reduced at their upper ends to receive the depending lip of an annular upper rotor member 106 secured in spaced relation to the bottom 102 by means of several bolts 108. The teeth 104 join a circumferential series of radially directed outwardly converging rotor slots 110.

The upper rotor member 106 terminates inwardly in a flanged rim 112 to form an annular inlet passage surrounding the shaft 100. In sealing engagement with the rim 112 is the depending flange 114 of an upper stator member 116 formed as a broad annulus extending out beyond the rotor but having a thickened outer segment very closely spaced from the upper portion of the outer periphery of the rotor. Cooperating with the upper stator piece 116 is a lower stator member 118 comprising a thick ring machined to form a circumferential series of wedge-shaped spacers 120 which form a series of radially directed outwardly diverging stator slots 122 having their dimensions and half angles within the ranges previously discussed. In order to avoid awkward circumlocutions in the claims we shall orient the pieces as shown in Fig. 10 and refer to the walls of each stator slot formed by the members 116 and 118 as the "upper" and "lower" walls as opposed to the walls formed by the spacers 120. It will of course be understood that this terminology is merely convenient; there is nothing critical in the positioning of the generator.

The bottom of the generator housing and the bottom of the horn are conveniently cast in one bowl-shaped piece 124 which supports the lower stator member 118 and extends outwardly far enough to form a properly divergent horn bottom 126. The assembly is completed by an upper horn piece 128 bolted to the upper stator member 116 as shown at 129. Integral with the upper horn member is an annular stiffening rib 130 and a plurality of radial stiffening ribs 132. Also integral with the upper horn member 128 is an annular inclined ring or plate 134 serving as the focussing reflector.

The functions of the elements shown in Fig. 10 are the same as those of the corresponding members shown in Figs. 1 and 2. The angles and dimensions of the stator and horn elements follow the conclusions reached in the discussion of Figs. 3–9 and need not be repeated. The embodiment shown in Fig. 10 represents the best mode now known to us for the practice of the factors of our invention relating to the construction of the rotor, stator, and horn. Those skilled in the art will readily appreciate the many variations possible within the scope of the appended claims.

In Figs. 11, 12 and 13 we have shown a form of generator that constitutes a variation from that shown in Figs. 1, 2 and 7–9. The additional showing of Figs. 11–13 illustrates the fact that many of the features of our invention are not limited to a generator built to the form shown in the other drawings referred to. We have discussed a rotor in which the air is conducted to the center and forced radially outward through radially disposed stator throats. In Figs. 11–13 we show a rotor placed behind an annular stator and adapted to control the passage of air along paths parallel to the axis of rotation of the rotor and passing at right angles to the rotor as opposed to the radial arrangement hitherto under consideration. The throat and horn construction radiates sound in a beam immediately parallel to the axis of the rotor without requiring reflection by an annular plate of the type shown at 23 in Fig. 1. In Fig. 11 the elevation is of the front of the horn looking into the stator throats, and Figs. 12 and 13 are diagrammatic sections through the rotor-stator-horn combination. All of the letters used to designate dimensions and angles in Figs. 11, 12 and 13 correspond exactly to those shown on the other figures and all of the remarks made in conjunction with them are equally applicable.

We realize that the improved sound wave generator disclosed herein embodies several apparently unrelated features. However, it should be remembered that whereas prior siren type sound wave generators operating at frequencies above 100° C. P. S. have produced a maximum of 50 watts of acoustic power, we have succeeded in producing more than 20,000 watts of acoustic power. No one feature of the invention has been responsible for this tremendous increase. It is the combination of the features which has resulted in a virtually new source of industrially useful energy.

Having now described and illustrated preferred embodiments of our invention, what we claim as new and desire to secure by Letters Patent of the United States is:

1. A sound wave generator comprising a housing, a shaft journalled in the housing, a rotor secured to said shaft and having a chamber communicating with an annular inlet passage surrounding the shaft and with a circumferential series of radial slots disposed along its outer periphery, an annular stator closely surrounding said rotor and having a series of radial stator openings merging into radially extending throats, and a radially arranged 360° annular horn surrounding said stator and communicating with said throats, whereby a fluid may be introduced adjacent the center of the rotor and expelled radially in all directions along straight lines passing through said rotor, stator and horn.

2. A sound wave generator comprising a housing, a shaft journalled in the housing, a rotor secured to said shaft and having a chamber communicating with an annular inlet passage surrounding the shaft and with a circumferential series of radial slots disposed along its outer periphery, an annular stator closely surrounding said rotor and having a series of stator openings merging into radially extending throats, a 360° radial annular horn surrounding said stator, and an annular reflecting plate disposed at the mouth of said horn in position to receive and reflect sound waves emerging therefrom, whereby a fluid may be introduced adjacent the center of the rotor and expelled radially through 360° along straight lines passing through said rotor, stator and horn and then encountering said reflecting plate.

3. A sound wave generator comprising a housing, a shaft journalled for rotation within said housing, a turbine wheel secured to said shaft, a hollow rotor secured to said shaft and spaced from said turbine wheel, a series of turbine nozzles disposed within the housing in cooperative relation with said wheel, walls forming chambers on each side of said wheel, for turbine driving fluid inlet and exhaust, walls forming an inner chamber communicating with the interior of the rotor and with the inner side of said wheel, means for admitting fluid to said inner chamber, said inner chamber being substantially sealed to the interior of the rotor, vents in said housing on either side of said rotor but not communicating with the interior thereof, or with the inner chamber, and an annular stator mounted upon said housing and closely surrounding said rotor.

4. A stator horn assembly for generators producing sound waves in a given frequency range comprising upper and lower walls, wedge-shaped spacers confined between the walls to form an annular series of stator openings and radially directed outwardly diverging throats, the maximum distance between the bases of adjacent spacers being one half inch, the spacers being constructed to form throat walls diverging at half angles between 3 and 12 degrees for a distance at least equal to a half wavelength of sound in the given frequency range, the upper and lower walls being arranged to form throat walls diverging outwardly at half angles between 3 and 12 degrees for a distance at least equal to a wavelength of said sound, and upper and lower horn walls secured to the stator and forming continuations of said throats diverging at half angles of not substantially more than 30 degrees.

5. A sound wave generator comprising a housing, a peripherally slotted hollow rotor mounted for rotation within said housing and having an inlet passage concentric about its axis of rotation, an annular stator concentric with the rotor and mounted in said housing, walls forming an inner chamber in said housing communicating with said passage, ports in said housing communicating with spaces in the housing adjacent the upper and lower outer surfaces of said rotor and with the atmosphere but not with said chamber, whereby fluid under pressure may be introduced through said passage to the interior of the rotor but external pressures upon the upper and lower sides thereof are equalized.

CAPERTON B. HORSLEY.
GORDON C. SEAVEY.

REFERENCES CITED

The following references are of record in the file of this patent:

UNITED STATES PATENTS

| Number | Name | Date |
|---|---|---|
| 1,208,887 | Anderson | Dec. 19, 1916 |
| 1,585,219 | Webb, Jr. | May 18, 1926 |
| 1,761,162 | Volf, Jr. | June 3, 1930 |
| 1,985,954 | Settegast | Jan. 1, 1935 |
| 2,292,376 | Hayes | Aug. 11, 1942 |
| 2,354,684 | Jones et al. | Aug. 1, 1944 |
| 2,372,968 | Metcalf | Apr. 3, 1945 |

FOREIGN PATENTS

| Number | Country | Date |
|---|---|---|
| 42,562 | France | May 22, 1933 |
| 216,971 | Germany | Nov. 1, 1908 |
| 246,739 | Germany | May 9, 1912 |
| 351,572 | Germany | Apr. 29, 1922 |